Patented Oct. 31, 1922.

1,434,133

UNITED STATES PATENT OFFICE.

TAINE G. McDOUGAL, OF FLINT, MICHIGAN, ASSIGNOR TO CHAMPION IGNITION COMPANY, OF FLINT, MICHIGAN, A CORPORATION OF MICHIGAN

SPARK-PLUG INSULATOR.

No Drawing.   Application filed October 30, 1920.  Serial No. 420,680½.

*To all whom it may concern:*

Be it known that I, TAINE G. McDOUGAL, a citizen of the United States, and a resident of Flint, county of Genesee, and State of Michigan, have invented certain new and useful Improvements in Spark-Plug Insulators, of which the following is a full, clear, concise, and exact description such as will enable others skilled in the art to which the invention relates to make and use the same.

The invention relates to the manufacture of porcelain products and has particular reference to insulators, such as spark plug insulators, which are required to exhibit a high degree of dielectric strength and toughness under conditions such as exist in the internal combustion engine, especially in the presence of such extreme temperatures and pressures as occur, for example, in aeroplane engines.

In an endeavor to impart these qualities to porcelain articles of the type referred to, there has been ordinarily utilized in their manufacture a body mixture comprising as large a content as possible of calcined material, the remainder of the mixture being made up of a blend of various clays. In one of the processes of manufacture commonly employed, it is customary to shape the article from a plastic mass comprising the said body mixture, to dry the formed article to a condition of leather hardness, to finally shape the partially dried article to desired dimensions by a turning operation or otherwise, and then to complete the drying, after which the article may be fired in the usual manner.

It has been found difficult hitherto to form mixtures which possess sufficient toughness to withstand the treatment by the process stated, especially the turning while at a leather hardness, and which exhibit sufficiently high thermo-dielectric strength and toughness when fired. So far as I am aware, no such mixtures have been found desirable or commercially successful in which the content of calcined material, which is in itself nonplastic, has amounted to more than approximately fifty percent. Even with this percentage it has been necessary to use for the remainder of the mixture a blend of clays some of which are of extraordinary plasticity. A number of clays have been known for many years which, owing to their extreme fineness or colloidal nature, are capable of imparting plasticity to relatively large proportions of non-plastic bodies, among which may be mentioned the ball clays, such as English and Kentucky ball clays, bentonite clay and ehrenbergite clay, as well as clays to which have been added small amounts of electrolytes or of certain gums. In the preparation of body mixtures for spark plug porcelains, the ball clays have been generally used, the English clay being particularly valuable. It has been found commercially impracticable, however, to use more than approximately twenty percent of the ball clays, owing to the fact that, when used in larger amounts, they impart undesirable properties to the product, such as air cracking and warping while drying, and poor color, brittleness, and glassy fracture in the burned articles. The relatively high cost of these clays, and especially of the English clay, has been a further objection to their use on a commercial scale.

The principal object of my invention, therefore, is to produce a spark plug insulator, or like ceramic article, or a composition therefor, in which the content of non-plastic mineral ingredients imparting thermo-dielectric strength and toughness is extraordinarily high, at the same time maintaining the qualities necessary to permit the mixture to be satisfactorily worked into the desired shapes. To this end I propose to utilize a proportion of the plasticity imparting clays much less than ordinarily employed, including therein preferably a small percentage of ball clay and a still smaller percentage of bentonite clay, also employing in the mixture a relatively large proportion of kaolins or china clays, which are more satisfactory than ball clays from the standpoint of their effect upon the burned product.

The extremely high plasticity of bentonite clay has been referred to in various publications, for example in Clays, by Ries, published in 1906, pp. 457-458, and in an article by W. C. Knight in Eng. and Min. Jour., LXVI, p. 491 (1898), and its use in the manufacture of porcelain is suggested in the article by Mr. Knight, but serious difficulties have been found to attend attempts by ceramists to utilize it in practical application. Ries and Keele (Canadian Dept. of Mines, Report on the Clay and Shale Deposits of the Western Provinces, 1913, pp. 56 and 74), experimented with mixtures of three parts sand and one part bentonite clay and refer to the plasticity imparting characteristics of the material, but they point out (pp. 74 and 89-90) that the products formed from bentonite clay crack badly in air drying. In fact these experimenters concluded that the presence of bentonite clay is a potent factor in producing air cracks in mixtures containing it, which fact they demonstrated by tests performed upon clay mixtures containing ten percent of bentonite clay (p. 90).

So far as I am aware, the universal experience hitherto in attempting to use bentonite clay in mixtures has been with similar results, i. e. that air cracking or warping, or both, developed while drying or burning, or both, to such an extent that the use of the material was not commercially practicable. I have found, however, that by suitable combination of ingredients and proper balancing of the proportions thereof, and the use of relatively very small percentages of bentonite clay, it is possible to prepare body mixtures which not only are free from the defects previously deemed inseparable from the use of this material, but which possess, to an enhanced extent, the properties desirable for ceramic articles of the type herein mentioned.

The percentage of bentonite clay which is necessary in order to enable a satisfactory mixture to be produced without causing air cracks or warping will, of course, vary somewhat with the proportions of the other ingredients making up the plastic content, but in no case does it amount to as much as five percent, in fact the most satisfactory results have followed the use of from one to three percent. The addition of this small percentage, however, renders possible a material increase in the non-plastic content upon which depends primarily the toughness and thermo-dielectric strength of the product. This result is obtained, moreover, without any increase in the percentage of the ball clays, which increase would have a tendency to impart a greater degree of brittleness and glassy fracture to the burned product, thereby defeating the purpose for which the abnormally large amount of non-plastic or calcined material had been added. The content of ball clay may even be reduced, thus enabling the product to be improved by either, or both, reducing the content of ball clay or increasing that of calcines.

To make the effect clearer, I refer to the following diagrammatic representation of the possible manipulation of proportions.

| Calcines | China clay | Ball clay |
|---|---|---|
| 50% | 30% | 20% |

| Calcines | China clay | Ball clay |
|---|---|---|
| 60% | 10% | 30% |

| Calcines | China clay | Ball clay | Bentonite |
|---|---|---|---|
| 60% | 30% | 7% | 3% |

The first line of the table indicates a typical mixture as hitherto constituted, approximately twenty percent of ball clays being necessary in order to enable the use of fifty percent of calcines.

The second line indicates the approximate change which is necessary with the use of ball clays in order to increase the content of calcines to sixty percent, i. e. the amount of ball clays must also be increased, thereby rendering the mixture commercially quite impracticable.

The third line indicates a mixture in which, by the use of bentonite clay, the proportion of calcines has been raised and that of ball clays lowered, without necessitating a reduction in the original content of china clays. These ingredients in substantially the proportions indicated, viz.

Non-plastic material (mostly or all calcines) _____ 60%
China clays (which may comprise a mixture of Florida and English kaolin) _____ 30%
Ball clay (for example Kentucky ball) _____ 7%
Bentonite clay_____ 3% constitute a practical body mixture applicable to the manufacture of porcelain insulators for spark plugs. The non-plastic materials will comprise preferably ingredients such as magnesite, calcium carbonate, flint, aluminum oxide, and china clay, which may be mixed, heated or calcined, and subsequently ground to a fineness such as to pass through a screen of 120 mesh. The particular proportions or ingredients making up whatever percentage of non-plastic content may be decided upon, may be varied widely as desired to determine the properties of the burned product without, however, requiring variation in the proportions of the plastic ingredients or affecting the working qualities of the composite mass. A reduction of the relative amount of non-plastic content may be accompanied by a corresponding reduction in the percentage of bentonite clay or ball clay, or both.

The articles formed from a porcelain body mixture of the type indicated possess marked advantages over those hitherto obtainable by the method above set forth as commercially employed. The materially higher content of non-plastic ingredients imparts to the product higher thermo-dielectric strength and greater mechanical toughness, while the reduction in the proportion of ball clays in the plastic content results in an improvement in the color and also in the mechanical toughness of the product.

I claim:

1. A porcelain body mixture comprising a non-plastic mineral content of not less than approximately sixty percent, the remainder comprising a blend of clays imparting plasticity to the mixture and sufficient toughness to permit working when dried to leather hardness but without producing air cracks in drying.

2. A porcelain body mixture comprising a non-plastic mineral content of over fifty percent, the remainder consisting of clays including china clay, ball clay, and bentonite clay, the latter to the amount of less than five percent of the entire mixture.

3. A porcelain body mixture comprising a relatively large non-plastic mineral content adapted to impart thermo-dielectric strength and toughness to the burned product, and a plastic content of clays including china clay, ball clay, and bentonite clay, the latter to the amount of not more than three percent of the entire mixture.

4. A ceramic composition for spark plug insulators comprising a non-plastic content of approximately sixty percent and a plastic content including approximately thirty percent of china clay, seven percent of ball clay, and three percent of bentonite clay.

5. A spark plug insulator body comprising, before being fired, over fifty percent of non-plastic mineral material adapted to impart thermo-dielectric strength and toughness to the burned product, and a plastic content comprising china clay, ball clay and bentonite clay, the body being sufficiently tough to permit shaping when dried to leather hardness.

6. A refractory material containing not more than 5% of bentonite.

In testimony whereof I affix my signature.

TAINE G. McDOUGAL.